(No Model.)

J. J. HOGAN.
COUPLING FOR RADIATOR SECTIONS.

No. 411,031. Patented Sept. 17, 1889.

Attest:
L. Lee.
F. C. Fischer.

Inventor.
John J. Hogan, per
Cram & Miller, Attys.

UNITED STATES PATENT OFFICE.

JOHN J. HOGAN, OF NEW YORK, N. Y.

COUPLING FOR RADIATOR-SECTIONS.

SPECIFICATION forming part of Letters Patent No. 411,031, dated September 17, 1889.

Application filed April 10, 1888. Serial No. 270,235. (No model.)

*To all whom it may concern:*

Be it known that I, JOHN J. HOGAN, a citizen of the United States, residing at New York, county and State of New York, have invented certain new and useful Improvements in Couplings for Radiator-Sections, fully described and represented in the following specification and the accompanying drawings, forming a part of the same.

The invention is applicable for use in connecting together a series of separate hollow sections through which water or steam may be circulated, and is adapted particularly for connecting the separate sections of which steam and water radiators are commonly composed.

The object of the invention is to connect such sections together separately, so that any number of such sections may be combined in a series and readily detached from one another.

The invention consists, primarily, in a coupling plug or sleeve of particular construction applied externally to the joint of the separate sections.

It also consists partly in the combination, with hollow sections having corresponding openings upon opposite sides, of a taper seat flaring inwardly upon one of such sides, a screw-thread in the opening upon the opposite side, and a sleeve provided with a divided conical collar fitted in a neck or groove upon the sleeve, the collar being adapted to fit the taper seat upon one section, and the sleeve being provided at the opposite end with a screw to fit the screw-thread upon the adjacent section.

It also consists in an aperture formed within the sleeve to fit a key or wrench, and in an annular conical collar or packing fitted to the tapering seat and pressed thereon by the plug. The aperture in the plug or sleeve would generally be extended through the same to form a communicating passage between the interiors of the several sections.

The invention will be understood by reference to the annexed drawings, in which—

Figures 1, 2:
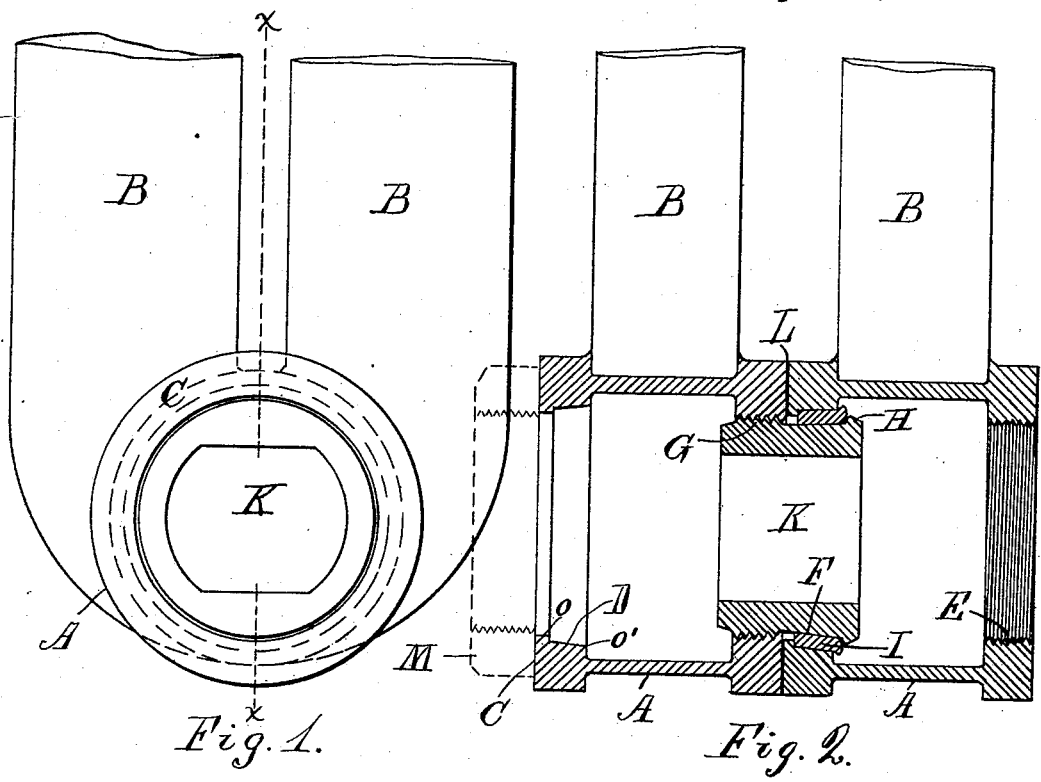
Figures 3, 4, 5:
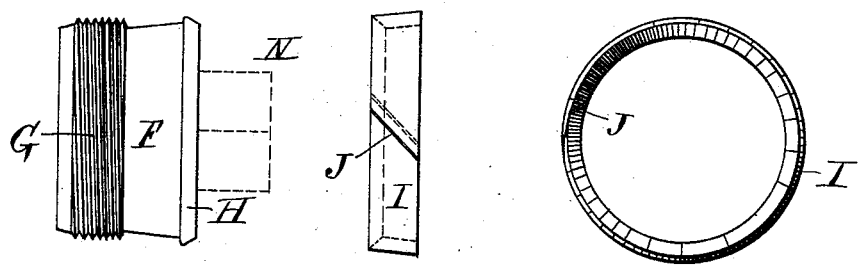
Figure 6:
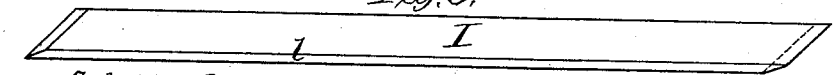

Figure 1 is an end view of the base of a radiator-section with the plug inserted in the screw-thread at its farther side. Fig. 2 is a vertical section, on line *x x* in Fig. 1, of two sections united by my improved coupling. Fig. 3 is a side view of the plug detached. Fig. 4 is an edge view of the annular conical packing, and Fig. 5 is a side view of the same. Fig. 6 is a perspective view of a strip of packing.

The invention is shown in Fig. 1 applied to the transverse connecting chamber A, which is commonly formed at the bottom of radiator-columns to distribute the steam to such columns, and the pattern of radiator-section, the base of which is shown in Fig. 1, is formed with two such columns B, one of which appears in the section in Fig. 2 communicating with the interior of the chamber. The chamber is formed at its opposite ends with circular seats C, perforated to establish communication between the exteriors of the several chambers and columns. One of such perforations in my construction is formed as a conical seat D flared inwardly, and the other is formed with an internal screw-thread E. The plug and packing used as a coupling are adapted to bear upon the conical seat and screw-thread when the latter are placed in contiguity, as shown in Fig. 2, the plug being formed with a neck F, a screw G, and a collar H, as shown in Fig. 3. The smaller end of the neck is attached to the screw G, and the larger end of the neck or of the collar H, if one be employed, is preferably made small enough to pass through the aperture provided with the thread E. The conical seat D is made larger at its smallest point than the outside of the screw G, and the plug is applied to operate as a coupling between the two sections by first inserting it through the seat D or thread E upon one side of a section into the interior of the chamber A. Here an annular conical packing I, adapted to fit between the neck F and the seat D, is fitted around the neck, and the plug is projected through the adjacent seat D and the screw G inserted in the thread E of the adjacent section. The plug is shown with an aperture adapted to fit a turnkey by which it may be then screwed firmly into the thread E, forcing the packing I directly upon the seat D. The aperture K is shown in the plug in Fig. 1 with two flattened sides extended through it, such flattened sides serving for the introduction from one of the adjacent openings of a suitable turnkey or wrench, having two flattened sides to fit such aperture; but any form of aperture may be employed for the same purpose, or the plug may be turned by any other convenient means. The annular packing is shown in Fig. 4 with a beveled joint J, and may in practice be made in the form of a straight strip, as shown in Fig. 6, suitably shaped to bend into a circle smaller than the aperture with thread E, so that it may be readily inserted through such aperture and then expanded within the chamber A, to apply it either to the exterior of the neck F or to the interior of the seat D. The neck of the plug is shown conical in the drawings, and the interior of the annular packing I is fitted thereto; but it is obviously immaterial whether the neck F be conical or not, as the element which co-operates with the conical seat D is the exterior of the packing, which therefore requires to be conical upon its outer side. By my invention the packing operates to enlarge the neck of the plug, so that although the neck may be inserted within the chamber before the packing is applied the packing prevents its withdrawal. The packing converts the neck of the plug into a cone externally, and the longitudinal movement of such cone within the seat operates to jam such packing very tightly, and if the packing be made of ductile metal, as copper or lead, it would obviously form a close steam-joint. By adding the collar H to the larger end of the plug the packing is forced longitudinally into the seat before it is jammed thereon, and as the packing is thus contracted in diameter the ends at the joint J may be forced closely together before the packing is subjected to compression on the seat to complete the joint.

In Fig. 2 a shoulder o is shown formed at the outer end of the conical seat D, and the collar H is rounded upon the outer corner adjacent to the packing I, and the packing is made wide enough to project over the inner edge o' of the seat D when in contact with the shoulder o. By this construction the packing, when forced against the shoulder o, is unable to advance any farther, and the edge adjacent to the collar H is expanded outwardly, (like the ends of fire-tubes fitted into boiler-heads,) and the packing is thus prevented from crowding any farther in the seat under any strain that may subsequently be applied to the radiator-sections. The crushing or flanging of the packing upon the seat also operates to form a very close joint between the collar H and the corner o' of the conical seat, and thus effectually prevents leakage at any point of the packing. The packing-ring is shown beveled quite acutely upon its outer edge, which bevel also appears in the blank or straight strip shown in Fig. 6, and is shown similarly beveled at l, to form a lap-joint at the union J of the two ends. The lock-joint at the ends assists to fit such ends closely together; but the bevel upon the edge of the packing-ring is for a totally different purpose, and is intended to operate, in conjunction with a taper upon the outer end of the collar H, to apply the packing-ring readily to the neck of the plug. Such application may be effected by compressing the packing-ring (with its end overlapped) and inserting it inside the chamber A. By then inserting the plug, with the collar first, through the conical seat D, the tapering form of the collar admits it readily within the flared or beveled edge of the packing, so that the packing may be readily expanded over the collar to reach the neck F by pressing upon its opposite edge and forcing it over such collar.

By the use of a metallic packing-ring the joint formed by the coupling is exceedingly rigid and adapted to endure severe strains, such as it is liable to receive in the handling of a large and heavy series of radiator-sections, and the joints between the seats C may be made by facing the same accurately, or a metallic packing-flange L may be inserted between such seats C to secure a perfectly-tight joint thereat, if preferred.

In uniting a series of radiator-bases in a straight line it has been common heretofore to make a tight joint between the several seats C, and to run a stay-bolt or tie-rod through the interiors of all the chambers A, with suitable flanges and nuts at the ends by which the sections could be pressed firmly together. It has also been common to connect separate sections by short pieces of threaded pipe provided in some cases with right and left hand threads and in others with a right-hand thread only.

Where it is desirable to connect radiator-sections both at the top and bottom, it is obvious that my coupling affords peculiar advantages, as it permits the sections to be laid close together before applying the coupling-plugs and the screwing of such plugs into their seats separately, whereas the use of right and left threads necessitates the careful fitting of two nipples at the same time and the turning of the same to their final position with great care. In like manner the use of a common right-hand nipple necessitates the turning of the entire section around and around and involves the risk of an imperfect joint if the threads do not bring the adjacent sections into the required position. It will also be noticed, as an important saving in construction, that only one of the apertures opening from the chamber A requires to have a screw-thread formed in it in the process of manufacture. This is a very material saving of expense, as the tools for forming threads are more expensive than other cutters and more easily dulled in use. If it were desired to connect a number of sectional bases together without an intermediate passage through the conical plug—such as is furnished by the perforation K—the plugs may be made solid with the neck F and thread G formed upon their exterior, and in such case the plugs may be turned in their seats by forming a square stud upon either end, as shown in the dotted lines N in Fig. 3, and using a socket-wrench to turn the same in the thread E.

It is obvious that if a series of similar sections be provided with my improvement and made interchangeable by the use of suitable tools the smaller end of the conical seat D must necessarily be larger than the screw G, as the screw is passed through such seat from the interior of the chamber to apply it to the adjacent thread E after the packing-ring is applied. In like manner the larger end of the neck F must be small enough to pass through the seat D or thread E to introduce it within the chamber, and the packing I is therefore a necessary element to complete the union between the seat and the neck. This arises from the fact that the smaller ends of the seat and neck cannot come into contact, because their opposite ends are of nearly the same diameter.

The collar H is obviously not essential to the seating of the packing I upon the neck, and where a tight joint is formed by a packing, as L, between the faces C it is wholly immaterial whether the joint of the packing (shown at J in Fig. 4) be perfected or not; but by the use of the collar H and the proper construction of the packing to form a close joint J the conical plug and screw G may be fitted so tightly to their respective seats that no leakage can occur from the interior of the adjacent chambers A.

Where it is desired to form the entire radiator of similar sections, the conical seat D at one end of the series (as at the left side of Fig. 2) may be readily closed by inserting one of the conical plugs made solid and drawn to its seat by a nut M, (shown in dotted lines,) and applied to the screw G upon the outside of the section.

It is obvious that the principal advantages of my invention result from the application of a coupling-plug to the interiors of the several joints, by which construction the effects of unequal expansion are entirely neutralized and each section is united rigidly to the adjacent section. The separate joints are not, therefore, dependent upon any common means of connection, but are made separately, and any section may be removed from the series without deranging or in any way affecting the joints of the other sections. Furthermore, when a heating apparatus requires an increase of capacity or radiating surface, additional sections may be added thereto by applying them successively to the threaded aperture of the last section in the series already formed and screwing the coupling-plug into such threaded aperture, as described above. By such means the additional sections can be readily and quickly attached without changing any of the parts already in the series.

It is obvious that my improvement may be applied to a joint at the top of a radiator-section, as well as at the bottom, sections now being in common use which are formed of two vertical columns having chambers at the top and bottom requiring to be united in such manner. It is of course wholly immaterial to my invention what the form of the chamber A is, either externally or internally.

Many forms of radiator-sections are employed by different makers in the construction of heating apparatus, and my improvement is applicable to any of such forms that may require connecting at a given point by a steam-tight joint.

The packing-ring may be divided at other joints than the one shown at J, and would then consist in several loose sections.

The coupling plug or sleeve forms a new article of manufacture, which may be sold in the same manner as elbows, T's, and other couplings are already sold, and may be fitted by the purchaser to suitable conical and threaded seats formed within the fixtures that it is desired to connect.

Having thus set forth the nature of my invention, what I claim herein is—

1. A coupling for radiator-sections, screwed to seats within the same, and provided with a conical packing in one side of the joint, as and for the purpose set forth.

2. The coupling for radiator-sections, consisting in the plug provided with the neck F, the screw G, and packing I, and fitted to the conical seat D, and the screw-thread E, formed upon the adjacent sections, as and for the purpose set forth.

3. A radiator-section provided with the chamber A, having apertures at opposite sides furnished, respectively, with the conical seat D and the thread E, as and for the purpose set forth.

4. As a new article of manufacture, a coupling or connection consisting in the sleeve having at one end the threaded portion and at the opposite end a divided conical collar fitted in a groove or neck upon the sleeve, substantially as herein set forth.

5. A coupling-plug for radiator-sections, consisting in the neck F, provided with the screw G upon its smaller end, and the larger end of the neck being made smaller than the bottom of the thread upon the screw G, as and for the purpose set forth.

6. A coupling-plug for radiator-sections, consisting in the conical neck F, screw G, and packing I, and with means for turning by a key or wrench, substantially as herein set forth.

7. A radiator composed of sections having upon their opposite sides the conical seats D and screw-threads E, and united by plugs provided with screw-threads and conical packings, substantially as herein set forth.

8. The combination, with two radiator-sections having apertures formed, respectively, with a screw-thread and with a conical seat, of a sleeve having a screw-thread at one end, and a divided conical collar fitted to the other end, as and for the purpose set forth.

9. The combination, with a radiator-section provided with the chamber A, having apertures at opposite sides, furnished, respectively, with the conical seat D, having shoulder o, and with the thread E, of the annular packing fitted to such seat, and the coupling-plug provided with the cone F, the screw G, and with the collar H, adapted to bear upon the outer edge of the packing, substantially as herein set forth.

10. The combination, with a radiator-section provided with the chamber A, having apertures at opposite sides furnished, respectively, with the conical seat D, having shoulder o and corner o', and with the thread E, of the annular packing fitted to such seat, and the coupling-plug provided with the cone F, the screw G, and with the collar H, rounded in contact with the edge of the packing and operated to expand the same outwardly over the corner o', as and for the purpose set forth.

11. The combination, with a radiator-section provided with the chamber A, having apertures at opposite sides furnished, respectively, with the conical seat D, having shoulder o, and with the thread E, of the annular packing beveled internally, as set forth, and the coupling-plug provided with the cone F, the screw G, and collar H, tapered externally to fit within the flared edge of the packing, as and for the purpose set forth.

In testimony whereof I have hereunto set my hand in the presence of two subscribing witnesses.

JOHN J. HOGAN.

Witnesses:
 H. J. MILLER,
 F. C. FISCHER.